(12) United States Patent
Safar

(10) Patent No.: US 8,031,586 B2
(45) Date of Patent: Oct. 4, 2011

(54) METHOD AND APPARATUS FOR TRANSMITTER TIMING ADJUSTMENT

(75) Inventor: Zoltan Safar, Copenhagen (DK)

(73) Assignee: Nokia Corporation, Espoo (FI)

( * ) Notice: Subject to any disclaimer, the term of this patent is extended or adjusted under 35 U.S.C. 154(b) by 825 days.

(21) Appl. No.: 11/893,249

(22) Filed: Aug. 15, 2007

(65) Prior Publication Data

US 2009/0046571 A1 Feb. 19, 2009

(51) Int. Cl.
H04J 11/00 (2006.01)
(52) U.S. Cl. ........ 370/210; 370/503; 375/260; 375/295; 375/344; 375/354
(58) Field of Classification Search .................. 370/210, 370/503; 375/260, 295, 344, 354
See application file for complete search history.

(56) References Cited

U.S. PATENT DOCUMENTS

| | | | |
|---|---|---|---|
| 6,272,192 B1* | 8/2001 | Yang | 375/355 |
| 6,687,307 B1 | 2/2004 | Anikhindi et al. | 375/260 |
| 6,754,170 B1* | 6/2004 | Ward | 370/208 |
| 2003/0026295 A1* | 2/2003 | Baum et al. | 370/503 |
| 2004/0120413 A1 | 6/2004 | Park et al. | 375/260 |
| 2004/0151110 A1 | 8/2004 | Mazzoni et al. | 370/210 |
| 2004/0151141 A1* | 8/2004 | Proctor et al. | 370/335 |
| 2005/0047325 A1 | 3/2005 | Singh et al. | 370/480 |
| 2005/0152326 A1* | 7/2005 | Vijayan et al. | 370/343 |
| 2008/0069252 A1* | 3/2008 | Wenzhen et al. | 375/260 |
| 2009/0046571 A1* | 2/2009 | Safar | 370/210 |

FOREIGN PATENT DOCUMENTS

| | | |
|---|---|---|
| EP | 1 193 933 A2 | 4/2002 |
| EP | 1 755 256 A1 | 2/2007 |
| WO | WO 01/22648 A1 | 3/2001 |
| WO | WO-2007/123340 A2 | 11/2007 |

OTHER PUBLICATIONS

"Technical Specification Group Radio Access Network; Physical layer aspects for evolved Universal Terrestrial Radio Access (UTRA) (Release 7)", 3GPP TR 25.814 V7.1.0 (Sep. 2006), 13 pgs.
Hyunkee Min et al: "A New Timing Offset Estimation Alogorith Using Phase Difference Adjustment Subcarriers in Interleaves OFDMA Uplink Systems," Wireless Communications and Networking Conference, Mar. 1, 2007, pp. 2431-2435, XP031097591.
$3^{rd}$ Generation Partnership Project; Technical Specification Group Radio Access Network; Radio Link Timing Adjustment (Release 5), 3GPP TR 25.878, V5.1.0 (Jun. 2002).

* cited by examiner

*Primary Examiner* — Luat Phung
(74) *Attorney, Agent, or Firm* — Harrington & Smith

(57) ABSTRACT

A timing adjustment value is received, and from the received timing adjustment value is determined an integer portion and a fractional portion. In the frequency domain, the determined fractional portion is applied by rotating a signal. Optionally, a phase shift may also be imposed with the rotation. In the time domain, the determined integer portion is applied by one of inserting samples in the rotated signal or removing samples from the rotated signal in an amount corresponding to the determined integer portion. After the signal rotation to apply the fractional portion, the active sub-carriers are mapped, and the transition from frequency domain to time domain occurs by means of an inverse Fourier transform. A cyclic prefix CP may be added after the Fourier transform, separately or functionally combined with the integer portion shift by modifying the size of the CP to impose the determined integer portion. After other conventional processing known in the art, the rotated signal as advanced/delayed by the sample removal/addition is then transmitted.

6 Claims, 5 Drawing Sheets

METHOD AND APPARATUS FOR TRANSMITTER TIMING ADJUSTMENT

TECHNICAL FIELD

The exemplary and non-limiting embodiments of this invention relate generally to wireless communications systems and, more specifically, relate to timing adjustments in an OFDM transmitter.

BACKGROUND

Various abbreviations that appear in the specification and/or in the drawing figures are defined as follows:

| | |
|---|---|
| 3GPP | 3rd Generation Partnership Project |
| BB | base band |
| BS | base station |
| CORDIC | coordinate rotation digital computer |
| CP | cyclic prefix |
| DAC | digital to analog converter |
| DC | direct current (in this context: zero frequency) |
| DFT | discrete Fourier transform |
| DFTS | discrete Fourier transform spread |
| EUTRAN | evolved universal terrestrial radio access network |
| FIR | finite impulse response |
| IEEE | institute of electrical and electronics engineers |
| IDFT | inverse discrete Fourier transform |
| IQ | in-phase/quadrature |
| LTE | long term evolution (3.9G) |
| MIMO | multiple input multiple output |
| MS | mobile station |
| OFDM | orthogonal frequency division multiplexing |
| OFDMA | orthogonal frequency division multiple access |
| PA | power amplifier |
| RF | radio frequency |
| RXDFE | receiver digital front end |
| TA | timing adjustment |
| TXDFE | transmitter digital front end |
| WiMAX | worldwide interoperability for microwave access |
| UMTS | universal mobile telecommunications system |
| UTRAN | UMTS terrestrial radio access network |

This invention is related to physical-layer wireless communications, and is described in the context of wireless OFDM communications such as OFDM/OFDMA based wireless communication systems. It is applicable to wireless standards 3GPP EUTRAN/LTE/3.9 G and to IEEE 802.16d/e/WiMAX, though not necessarily limited thereto and can be extended to any OFDM based wireless protocol.

In a cellular OFDMA-based wireless communication system, during uplink transmission, the transmitted signals from mobile stations (MSs) have to reach the base station (BS) approximately at the same time. The time of arrival differences should be smaller than the length of the cyclic prefix CP for demodulation. However, the distances between the various MSs and the BS may vary considerably, possibly by several kilometers depending on cell size. This can result in large variations in the signal propagation delays from the MSs to the BS. To equalize this propagation delay variation, the BS periodically sends control messages, commonly termed timing adjustment or timing advance (TA) messages, to the MSs to adjust their transmission times. The MSs then individually advance or delay their transmitted signals according to the TA value in the TA message. Since the BS sends the TA messages, the individual timing adjustments are such that the transmitted signals from the MSs reach the BS at the same time.

FIG. 2 is a prior art block diagram showing a conventional OFDMA-based transmit chain and receive chain. Each of the BS and the MSs include both chains, but for clarity the transmit chain is described with reference to an MS and the receive chain is described with reference to the BS since in the description of the invention below it is the MS that sends its timing adjusted signal to the BS. The OFDMA transmitter 20A in the MS takes a data bit stream as input and generates the base-band transmit signal, which is up-sampled and filtered in the digital front end (TXDFE) 22A. The signal is converted into an analog waveform and up-converted to pass-band in the RF transmitter stage 24A and transmitted through the transmit antennas 26A (only one shown). The RF stage of the receiver 24B in the BS receives the transmitted signal from the antenna(s) 26B, down-converts it in base-band and produces a digital signal stream. The receiver digital front end (RXDFE) 22B processes this signal by down-sampling and filtering (and performing other functionalities not relevant to these teachings), and the OFDMA receiver 20B demodulates the sent information-bearing symbols, producing estimates of the sent data bits. Even though FIG. 2 shows only one transmitter for the MS, in OFDMA systems there may be a number of MSs transmitting to the BS receiver at the same time.

Depending on the distance between these various MSs and the BS receiving their transmissions, the time it takes for the transmitted signals to propagate to the BS may vary considerably. In order for the BS to demodulate the transmitted signals from the MSs, these signals must arrive at the BS within a certain time window. In OFDMA systems, this time window is generally determined by the duration of the CP and the delay spread of the channel. To ensure that these signals arrive within that window, the MSs further away from the BS should transmit earlier, while the MSs closer to the BS should delay their transmitted signals. This is why the BS periodically sends TA control messages to the MSs as noted above, so that the multiple MSs could adjust their transmit timing in a coordinated fashion.

Exactly how the MSs impose the TA delay or advance in an OFDM system is not a new problem. In the prior art the TA functionality was implemented in the time domain by up-sampling and inserting/deleting samples to or from the up-sampled signal. In the diagram of FIG. 2, this TA advance or delay is therefore imposed at the transmit digital front end 22A. Specifically, a polyphase upsampling finite impulse response FIR filter for TA is included within the TXDFE 22A, or in other instances it was disposed in the OFDMA transmitter 20A. The coefficients of this FIR filter are periodically connected to the multipliers by commutator switches. The TA is then done by advancing or delaying the commutators with control logic. This prior art solution is not specific to OFDMA, and has been used in various devices adapted for other wireless protocols (e.g., global system for mobile communications GSM and wideband code division multiple access WCDMA). It is also used in some EUTRAN/LTE/3.9 G uplink transmitters. However, this is seen as somewhat inefficient as the upsampling factor needs to be increased by an amount sufficient to impose the TA advance/delay with sufficient precision. This higher upsampling factor increases the sampling frequency of the signal, and greatly increases processing load and power consumption. Also, a simple polyphase filer to implement this prior art approach requires additional control signals to the commutator switches to impose the TA functionality by holding or skipping a number of commutator switch positions.

Another prior art approach by which to impose the TA advance or delay is to insert the CP after up-sampling, but to insert a shorter or longer CP in order to advance or delay the transmitted signal by the amount of the TA given by the BS.

What is needed in the art is a way to implement for a transmitted signal with arbitrarily precise timing advances/delays based on the TA messages received from a base station. Preferably, such precision is at less computational overhead than the polyphase filter implementation detailed above for the prior art.

SUMMARY

In accordance with one embodiment of the invention is a method whereby a timing adjustment value is received, and from the received timing adjustment value is determined an integer portion and a fractional portion. In the frequency domain, the determined fractional portion is applied by rotating a signal. In the time domain, the determined integer portion is applied by one of inserting samples in the rotated signal or removing samples from the rotated signal in an amount corresponding to the determined integer portion. Subsequently, the signal is transmitted.

In accordance with another embodiment of the invention is an apparatus that includes a processor and at least one memory storing a program of machine-readable instructions. In this embodiment the processor is configured with the at least one memory and the instructions to cause the apparatus at least to perform: determining from a received timing adjustment value an integer portion and a fractional portion; applying in the frequency domain the determined fractional portion by rotating an input signal; and applying in the time domain the determined integer portion by one of inserting samples in the rotated signal or removing samples from the rotated signal in an amount corresponding to the determined integer portion.

In accordance with another embodiment of the invention is a computer readable memory embodying a program of machine-readable instructions executable by a digital data processor to perform actions directed toward applying a timing adjustment to a signal for transmission. In this embodiment the actions include determining from a received timing adjustment value an integer portion and a fractional portion. The actions then, in the frequency domain apply the determined fractional portion by rotating a signal, and in the time domain apply the determined integer portion by one of inserting samples in the rotated signal or removing samples from the rotated signal in an amount corresponding to the determined integer portion.

In accordance with yet another embodiment of the invention is an apparatus that includes processing means, fractional timing means, and integer timing means. The processing means is for determining from a received timing adjustment value an integer portion and a fractional portion. The fractional timing means is for applying in the frequency domain the determined fractional portion by rotating an input signal. The integer timing means is for applying in the time domain the determined integer portion by one of inserting samples in the rotated signal or removing samples from the rotated signal in an amount corresponding to the determined integer portion. In a particular embodiment of this aspect, the apparatus includes or is an orthogonal frequency division multiple access transmitter, in which the processing means includes a digital data processor, the fractional timing means includes a fractional timing adjustment block disposed in front of an inverse fast Fourier transform block, and the integer timing means includes an integer timing adjustment block disposed between the inverse fast Fourier transform block and a transmit antenna.

These and other aspects and embodiments are detailed more fully below.

BRIEF DESCRIPTION OF THE DRAWINGS

Embodiments of the invention are detailed below with particular reference to the attached drawing Figures.

DETAILED DESCRIPTION

The term timing adjustment or timing advance is used with reference to the timing adjustment value that is received, such as at the MS from the BS. The TA may be positive or negative, indicating timing delay or advance. As a broad overview, embodiments of this invention apply the timing adjustment in two distinct parts: a fractional portion is applied in the frequency domain as a signal rotation, and an integer portion of the TA is applied in the time domain as added samples to the rotated signal or removed samples from the rotated signal. After other conventional processing known in the art (upconversion to RF, power amplification, etc.), the rotated signal as advanced/delayed by the sample removal/addition is then transmitted.

Figure 1:
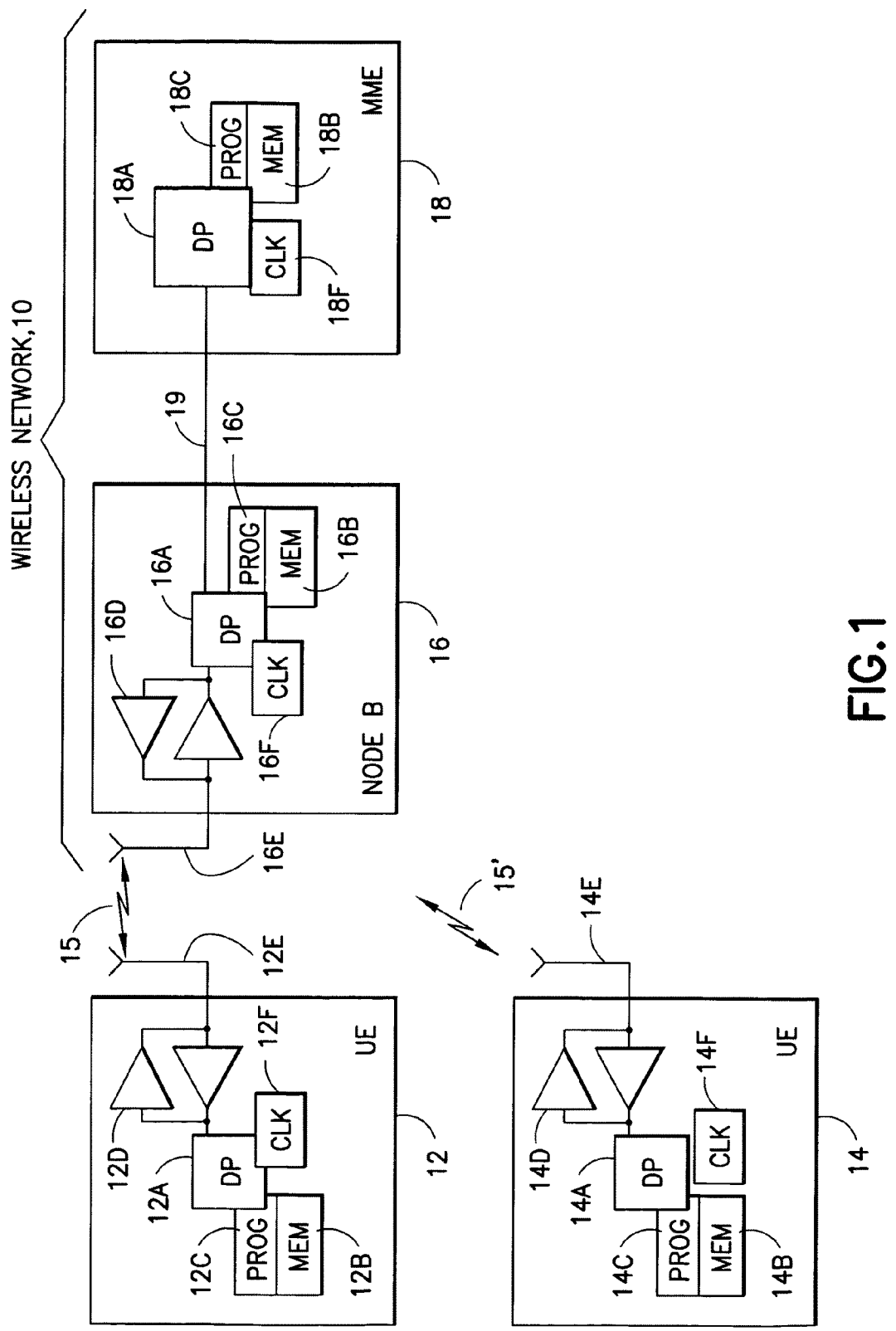
FIG. 1 shows a high-level schematic block diagram of various apparatus in which embodiments of the invention may be disposed and an environment in which they operate.

Before detailing more specific embodiments and variations of those embodiments, reference is first made to FIG. 1 for illustrating a simplified block diagram of various electronic devices that are suitable for use in practicing the exemplary embodiments of this invention. In FIG. 1 a wireless network 10 is adapted for wireless communication with a first mobile station MS 12 (which may be fixed or mobile as known in various networks 10) via a base station 16 (also termed in some networks a node B or e-node B). Also shown in a second MS 14 to illustrate that the various MSs 12, 14 in communication with the same BS/node B 16 may be at different distances from the BS/node B 16 and therefore have different signal propagation times for which the TA is intended to correct. It is noted that the MSs 12, 14 do not form a part of the network 10 (even in relay networks that uses an MS 12 to relay to/from another MS 14 or other network nodes such as fixed relay stations); the network provides service/access to the MSs 12, 14. The network 10 may include a serving radio network controller RNC 18 or other radio controller function known by various terms in different wireless communication systems (e.g., mobility management entity MME, gateway, etc.). The MS 12 includes a data processor (DP) 12A, a memory (MEM) 12B that stores a program (PROG) 12C, and a suitable radio frequency (RF) transceiver 12D coupled to one or more antennas 12E (one shown) for bidirectional wireless communications over one or more wireless links 15, 15' with the BS/node B 16. The MS 12 synchronizes its transmissions and functions with reference to a clock 12F, which is typically disposed on the DP 12A and slaved to reference timing signals sent from the BS/node B 16 over the wireless link 15. The MS 12 also uses its clock 12F to control sampling and decimation frequency and generally to impose on its transmissions to TA it receives from the BS/node B 16 as is detailed below by example.

The second MS 14 includes similar structure to the first MS 12 and is not further detailed. The BS/node B 16 each also include a DP 16A, 18A with a local clock 16F, and a MEM 16B, 18B that stores a PROG 16C, 18C. The BS/node B 16 also includes a suitable RF transceiver 16D (e.g., combined transmitter and receiver) coupled to one or more antennas 16E. The RNC/MME 18 is typically coupled over a data link 19 such as an Iub link to the BS/node B 16 though in some instances it may be a wireless link. The RNC/MME 18 includes a suitable modem and/or transceiver (not shown) as the case may be for communication over that data link 19.

As is known in the art, the BS/node B 16 sends to the first MS 12 over the first airlink 15 a first TA for that particular MS 12. To the extent the transmissions from the first MS 12 to the BS/node B 16 and those from the second MS 14 to the same BS/node B 16 exhibit different propagation delays, the BS 16 also sends over the second airlink 15' a different second TA to the second MS 14 so that the transmissions from both MSs 12, 14 are coordinated to arrive synchronously at the BS/node B 16.

At least one of the PROGs 12C and 14C and preferably both in the memories of the various MSs 12, 14 is assumed to include program instructions that, when executed by the associated DP, enable the electronic device to operate in accordance with the exemplary embodiments of this invention, as detailed further below.

The PROGs 12C, 14C may be embodied in software, firmware and/or hardware, as is appropriate. In general, the exemplary embodiments of this invention may be implemented by computer software stored in the MEM 12B, 14B and executable by the DP 12A, 14A of the MS 12, 14 within which it lies, and similar for the other MEMs and DPs of the BS/node B 16 (which processes in its receiver in the reverse of that described below for MS processing in its transmitter), or by hardware, or by a combination of software and/or firmware and hardware in any or all of the devices shown.

In general, the various embodiments of the MS 12, 14 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 12B, 14B, 16B and 18B may be of any type suitable to the local technical environment and may be implemented using any suitable data storage technology, such as semiconductor-based memory devices, magnetic memory devices and systems, optical memory devices and systems, fixed memory and removable memory. The DPs 12A, 12A, 14A and 16A may be of any type suitable to the local technical environment, and may include one or more of general purpose computers, special purpose computers, microprocessors, digital signal processors (DSPs) and processors based on a multi-core processor architecture, as non-limiting examples.

Having described the environment and appropriate hardware/software for implementing the various embodiments of the invention, now those embodiments are detailed with specificity. Relevant distinctions over the prior art are evident from the block diagram of FIG. 3, which shows an implementation of the OFDMA transmitter 20A of FIG. 2, but adapted according to an embodiment of this invention to separately apply two distinct portions of a timing adjustment value that is received (such as from the BS/node B 16). A fractional portion of that TA value is applied in the frequency domain as a signal rotation, and an integer portion of that TA value is applied in the time domain as added samples to the rotated signal or removed samples from the rotated signal.

Figure 3:
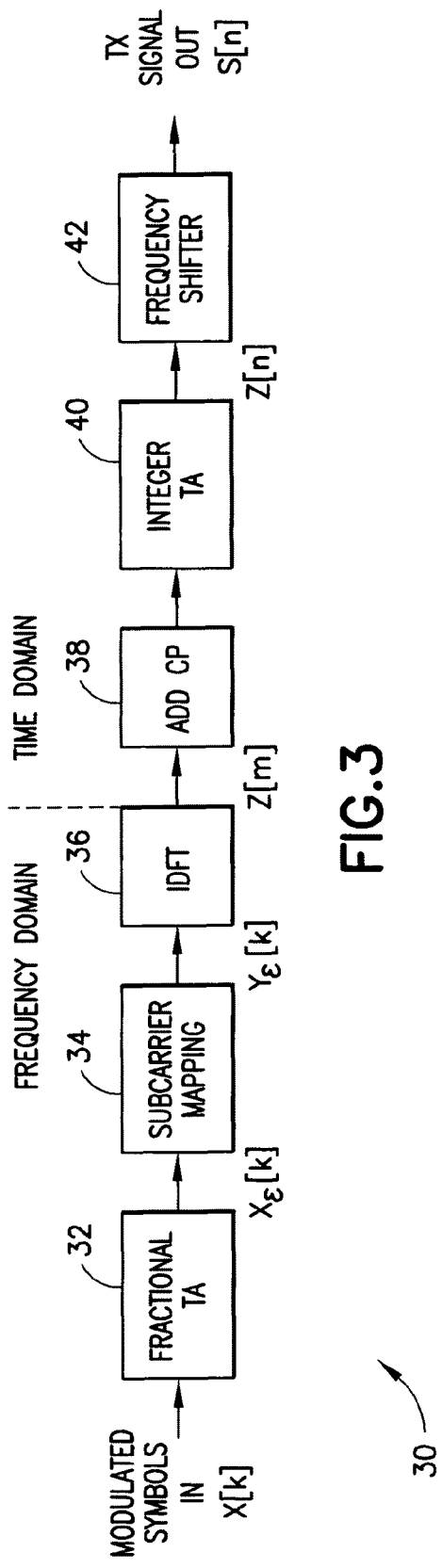
FIG. 3 is a block diagram of an OFDM transmitter according to an embodiment of the invention.

First are noted some general operational functions of certain blocks of the OFDMA transmitter 30 shown in FIG. 3. A sub-carrier mapping block 34 takes the frequency-domain symbols input to it, maps them onto the IDFT frequencies and inserts guard bands at the edges and possibly also the DC carrier. An IDFT block 36 transforms the frequency domain signal input to it into the time domain, and then the CP is added at the ADD CP block 38 to form the OFDMA transmit signal. If there is no DC carrier and the number of used sub-carriers is even (as it is in case of the current status of the uplink transmitter of the EUTRAN standard), a frequency shifter module 42 is also present to shift the signal that is eventually transmitted by half a sub-carrier separation. This shift makes the transmit spectrum symmetric. However, the frequency shifter module 42 may or may not be present in embodiments of the invention, as the system in which a particular embodiment operates may be restricted to odd numbers of sub-carriers and thus never have need to shift sub-carriers to achieve spectrum symmetry.

The TA received from the BS/node B 16 can be considered to have two parts or portions: an integer portion and a fractional portion. For example, a TA of 2.25 time units (e.g., chips) has integer portion 2 and fractional portion 0.25. Applying the TA according to an embodiment is functionally split into two operations: applying the integer portion (e.g., 2 chips) in the time domain which represents a "coarse" TA in multiples of the chip period (the sampling period without over-sampling); and applying the fractional portion (e.g., 0.25 chips) of the TA which performs "fine" timing adjustments in fractions of the chip period. The integer portion is applied in the time domain by inserting or removing samples in the signal or removing samples from it. The fractional portion is applied in the frequency domain and performs sub-carrier rotation and (optionally) phase shift that corresponds to a time advance or a delay in the time domain after the IDFT operation at the IDFT block 36.

Consider the above example TA of 2.25 chips. Without departing from these teachings, the MS 12 may implement this as either delaying (adding) 2 chips and delaying (rotating in a first direction) 0.25 chips, or as delaying (adding) 3 chips and advancing (rotating in a reverse direction) 0.75 chips. Each combination yields a net 2.25 chip delay and each is applied as an integer portion and as a fractional portion. In certain instances it may be more computationally efficient to overcompensate the integer portion and correct for that overcompensation via the fractional portion to achieve the net timing adjustment. Said another way, there is no requirement that the integer and fractional portions actually applied by the MS 12 are the same integer and fractional portions of the TA value received from the BS/node B 16. To keep the distinction, the message from the BS/node B 16 carries what is termed a TA value. From that received TA value the MS 12 determines an integer portion and a fractional portion, but as noted above the net of them may yield the received TA value even if individually they do not correspond to the integer or fractional portion of the TA value sent from the BS/node B 16.

Hereinafter, the specific implementation is described with respect to a DFTS-OFDMA transmitter according to the current status of the EUTRAN standard, as modified for this invention. Assume that the number of active sub-carriers is even and that there is no DC carrier present. For the case where a DC carrier is present and the number of active sub-carriers is odd, a similar transmitter architecture to that of FIG. 3 can be used, but with a different sub-carrier mapper and without the frequency shifter. Input into the DFTS-OFDMA transmitter 30 is a set of modulated symbols (output from a DFT block, not shown) that are spread across the OFDM sub-carriers. This DFT spreading operation does not affect implementation of the timing adjustment functionality shown in FIG. 3 and is therefore not shown explicitly. For simplicity FIG. 3 is shown in the context of one transmit antenna. For implementations in multi-antenna (MIMO) systems, the described operations would be performed independently for every transmit antenna using the same timing adjustment, either by parallel hardware shown in FIG. 3 or serial processing per antenna.

It is noted that FIG. 3 shows one particular modification to a traditional OFDM/OFDMA transmitter, but these teachings can be readily extended to any transmitter that uses IDFT-based modulation. Additional processing (e.g. DFT spreading) may be disposed before the fractional TA block 32 together with the corresponding processing (e.g. DFT despreading) at the receiver (BS) side. Further, the fractional TA block 32 can be placed before or after the sub-carrier mapping block 34, or before/after some other processing block. Similarly, other processing block(s) can be inserted after the IDFT block 36, before or after the integer TA block 40. The result of such changes to the transmitter arrangement may change the actual equations for the computations as compared to those detailed herein for the particular arrangement of FIG. 3, but the fundamental concept remains the same; an output of the fractional TA block 32 couples to an input of the IDFT block (frequency-domain, with or without intervening other blocks) and an input of the integer TA block 40 couples to an output of the IDFT (time domain, also with or without intervening processing blocks). As used above, before and after are in the context of the signal pathway through the transmitter (and receiver).

In the description below the following symbols are defined:
$N_a$—number of active (data carrying) sub-carriers (assumed above as an even number);
N—total number of sub-carriers (the size of the IDFT); and
$T_c$—chip period, defined as the sampling period without over-sampling, in seconds.

Returning to FIG. 3, the output of the DFT block (not shown) that is input to the fractional TA block 32 is the modulated symbols, denoted X[k], where k=0, 1, ..., $N_a$−1. These modulated symbols may contain (possibly DFT-spread) data symbols, pilot symbols or zeros, depending on the transmitted frame structure and the frequency-domain resource allocation for the transmitting users. Assume that the desired timing adjustment, Δ (in seconds, determined from the received TA value), is available, with the convention that positive Δ value means time delay (transmitting later), while negative Δ value means time advance (transmitting earlier). Then, Δ can be decomposed as Δ=(d+ϵ)$T_c$, where d is an integer (positive or negative) and −1≦ϵ<1. That is, d is the integer part of the TA, and ϵ is the fractional part of the TA with respect to the chip period $T_c$.

The fractional TA block 32 rotates and phase-shifts the input symbols according to:

$$X_\varepsilon[k] = \begin{cases} X[k]\exp\left\{j\frac{2\pi}{N}\left(k - \frac{N_a}{2}\right)(1-\varepsilon)\right\}\exp\left\{-j\frac{\pi}{N}(d+\varepsilon)\right\}, & \varepsilon > 0 \\ X[k]\exp\left\{-j\frac{2\pi}{N}\left(k - \frac{N_a}{2}\right)\varepsilon\right\}\exp\left\{-j\frac{\pi}{N}(d+\varepsilon)\right\}, & \varepsilon \leq 0 \end{cases}$$

for k=0,1, ..., $N_a$−1, producing the rotated sub-carriers $X_\varepsilon$[k] as output. The first exponential, the rotation, incurs the fractional time shift in the transmitted signal. The second exponential, the phase shift, compensates the phase shift of the frequency shifter module 42, as the frequency shifter module 42 does not change its phase according to the desired TA. Therefore, if the frequency shifter module 42 is not present in the OFDMA transmitter, or if the integer TA block 40 is placed after the frequency shifter module 42 (and not before as illustrated in FIG. 3), the second exponential is not needed. Note that only those sub-carriers are to be rotated that carry effective information in the current OFDMA block; i.e., guard band sub-carriers and sub-carriers allocated to other MSs 14 by the BS 16 need not be rotated.

The sub-carrier mapping block 34 maps the active sub-carriers onto the IDFT sub-carriers. It takes the rotated sub-carriers $X_\varepsilon$[k] as input and maps them onto IDFT sub-carriers $Y_\varepsilon$[k]:

$$Y_\varepsilon[k] = \begin{cases} X_\varepsilon\left[k + \frac{N_a}{2}\right], & k = 0, 1, \ldots, \frac{N_a}{2} - 1, \\ 0, & k = \frac{N_a}{2}, \frac{N_a}{2} + 1, \ldots, N - \frac{N_a}{2} - 1, \\ X_\varepsilon\left[k - N + \frac{N_a}{2}\right], & k = N - \frac{N_a}{2}, N - \frac{N_a}{2} + 1, \ldots, N - 1. \end{cases}$$

This operation maps the symmetric active sub-carrier range onto the non-symmetric IDFT sub-carrier range and introduces the guard band at the edges of the active sub-carrier range (in the middle of the non-symmetric IDFT sub-carrier range). For the case where there is an odd number of active sub-carriers $N_a$ and/or for the case where a DC carrier is used, this mapping is slightly modified from that detailed above as is known in the art.

The IDFT block 36 calculates the IDFT of the input sub-carriers $Y_\varepsilon$[k], transforming the frequency-domain symbols into time-domain samples Z[n]:

$$Z[n] = \frac{1}{N}\sum_{k=0}^{N-1} Y_\varepsilon[k]\exp\left\{j\frac{2\pi}{N}kn\right\}, \quad n = 0, 1, \ldots, N-1.$$

The next block, the add CP block 38, inserts the CP before each OFDMA symbol. The time-domain sample sequence after CP insertion becomes:

$$Z[n] = \frac{1}{N}\sum_{k=0}^{N-1} Y_\varepsilon[k]\exp\left\{j\frac{2\pi}{N}k(n - N_{CP})\right\}, \quad n = 0, 1, \ldots, N + N_{CP} - 1,$$

where $N_{CP}$ is the length of the CP in samples.

The integer TA block 40 delays the time-domain signal input to it by a number of samples determined by the integer portion of the TA. If we define the symbol D as $$D = \begin{cases} d+1, & \varepsilon > 0 \\ d, & \varepsilon \leq 0 \end{cases},$$

the delayed signal $Z_d[n]$ can be expressed as $$Z_d[n] = \begin{cases} 0, & n = 0, 1, \ldots, D-1 \\ Z[n-D], & n = D, D+1, \ldots, N+N_{CP}-1 \end{cases}$$

if $D > 0$, and $$Z_d[n] = \begin{cases} Z[n-D], & n = 0, 1, \ldots, N+N_{CP}+D-1 \\ 0, & n = N+N_{CP}+D, N+N_{CP}+D+1, \ldots, N+N_{CP}-1 \end{cases}$$

if $D \leq 0$.

This corresponds by the above convention to integer time delay if D is positive, and to integer time advance if D is negative. In a first embodiment the integer TA block 40 can be implemented by inserting (repeating) or removing samples from the time-domain signal Z[m]. In an alternative embodiment the function of the integer TA block 40 can be implemented by changing the size of the CP, inserting shorter (time advance) or longer (time delay) CP than the normal or nominal CP length. Functionally, this is simply combining the illustrated ADD CP block 38 to the integer TA block 40 into a single process block.

As noted above, the frequency shifter module 42 shifts the transmitted signal by half sub-carrier separation by rotating the time delayed/advanced signal $Z_d[n]$:

$$S[n] = Z_d[n]\exp\left\{j\frac{\pi}{N}(n - N_{CP})\right\}, \quad n = 0, 1, \ldots, N+N_{CP}-1.$$

Figure 2:
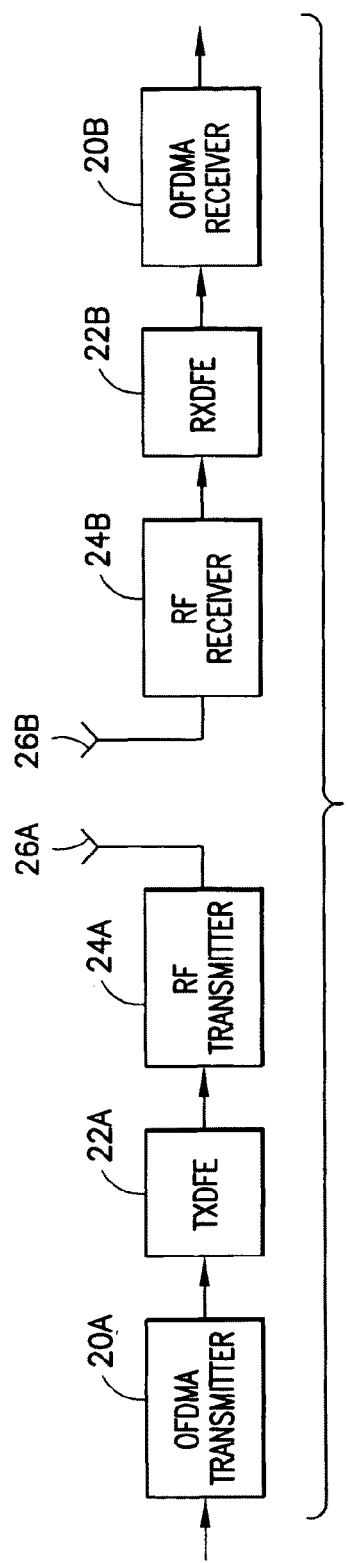
FIG. 2 is a prior art high level block diagram of a conventional OFDM transmitter chain and receiver chain.

The resulting signal, S[n], is the output of the OFDMA transmitter 30, which serves as the input signal to the TXDFE 22A shown in FIG. 2. As noted above, if the number of active sub-carriers, $N_a$, is odd, the frequency shifter block 42 is not necessary as the output spectrum is symmetric without the frequency shift.

Figure 4:
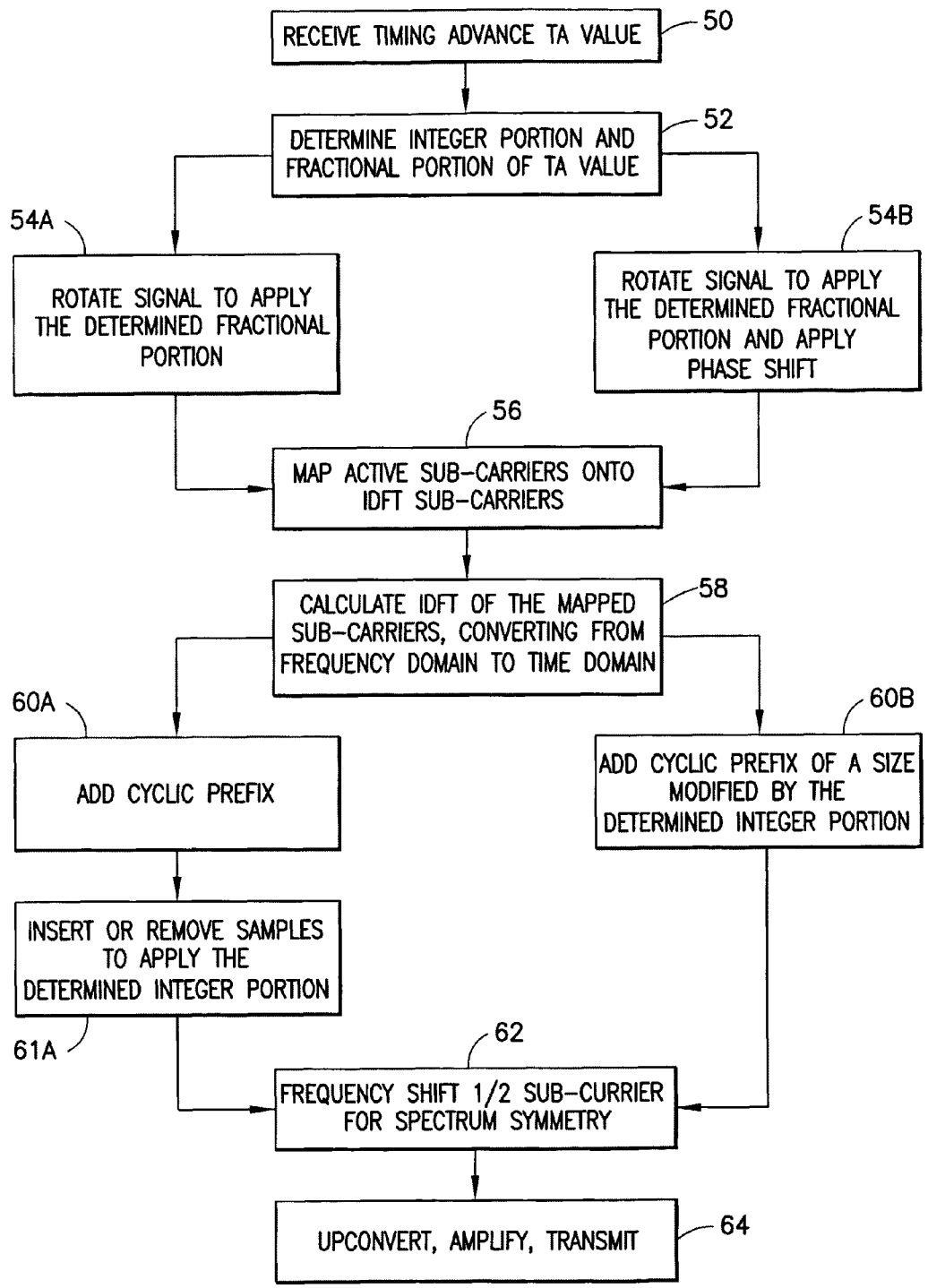
FIG. 4 is a process flow diagram according to an embodiment of the invention.

FIG. 4 is a series of process steps outlining the above approach. At block 50 the timing adjustment value is received from the BS/node B 16. At block 52 the MS 12 determines the integer and fractional portions from that received TA value. In one embodiment at block 54A, the MS 12 applies rotation only at the fractional TA block 32 and applies the fractional portion by rotating the signal. In another embodiment at block 54B the MS 12 both rotates and phase shifts the signal. The subcarrier mapping block 34 maps the active subcarriers at block 56 onto the sub-carriers on which the IDFT is executed at block 58. Note that block 58 is where the change from frequency domain to time domain occurs. In one embodiment the cyclic prefix is added at block 60A and subsequently the determined integer portion is applied by inserting or removing samples at block 61A. In another embodiment those two functions are combined at block 60B by adding a cyclic prefix whose nominal size is adjusted by the amount of the samples that would be removed or added were the functions separate, so as to apply the integer portion in the specially sized cyclic prefix. Where the number of sub-carriers is even they are frequency shifted at block 62 for spectrum symmetry, and at block 64 the rotated and integer shifted signal is upconverted to RF, amplified and transmitted.

The inventor subjected the above embodiment to simulation to test its effectiveness. The simulated single-antenna DFTS-OFDMA transmitter had the following parameters:
RF bandwidth: 5 MHz;
Modulation: 16 QAM;
Total number of sub-carriers: N=512;
Number of active sub-carriers: $N_a$=300;
CP length: $N_{CP}$=31;
TXDFE up-sampling factor: 4× with a spectrum shaping filter of length 64; and
No DAC quantization effects, no PA non-linearity, and no oscillator non-idealities (e.g., phase noise, IQ imbalance, etc.) were simulated.

Figure 5:
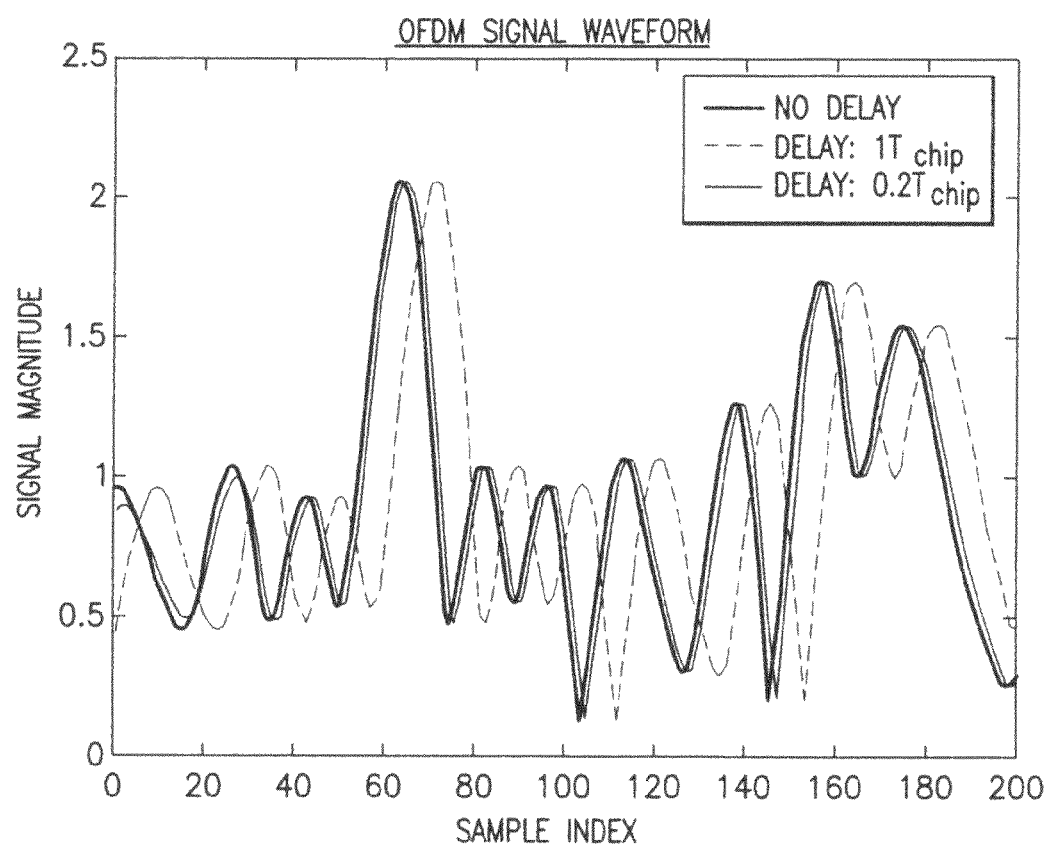
FIG. 5 is a diagram of signal sample index versus signal magnitude comparing a signal with no delay, with only an integer chip delay, and with only a factional chip delay.
Figure 6:
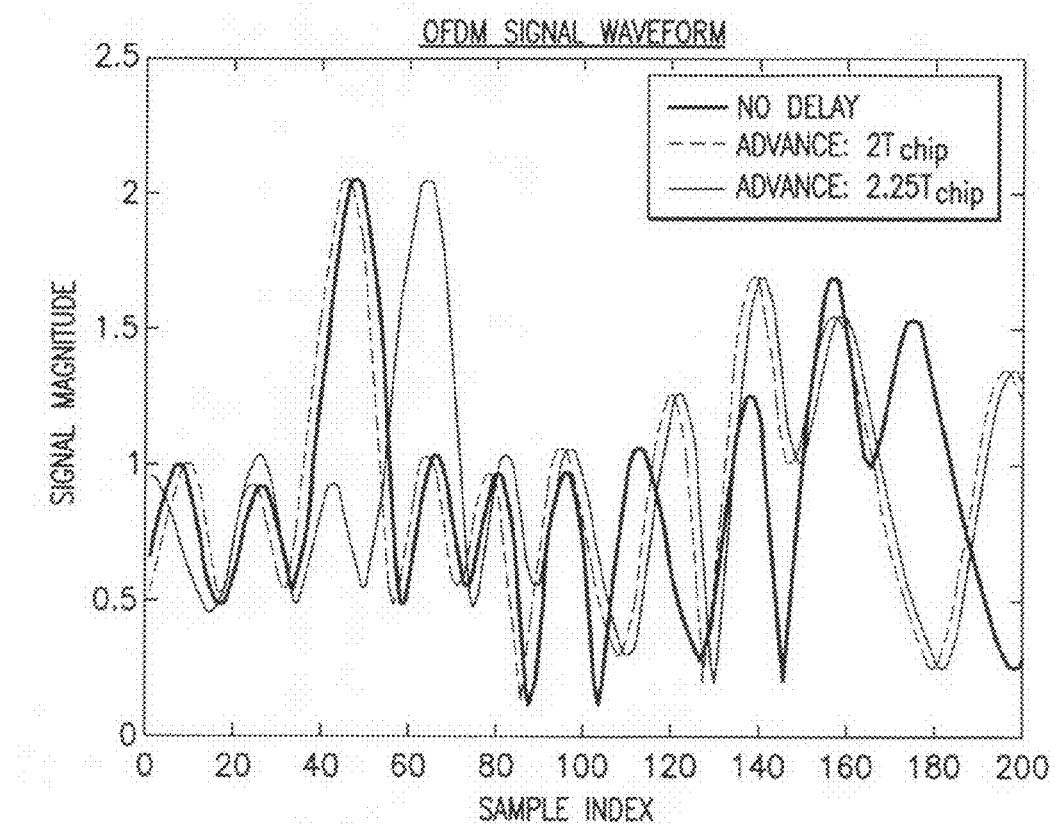
FIG. 6 is similar to FIG. 5 but comparing a signal with no timing adjustment to a signal with only an integer chip advance and to a signal with a combined integer and fractional chip adjustment.

FIG. 5 depicts the magnitude of the digitally simulated transmitted analog base-band waveform with delayed transmission (transmitting later), while FIG. 6 shows the transmitted waveform with time-adjusted transmission (transmitting earlier). As can be seen, the approach detailed above works with arbitrary TA values even if the TA value is not a multiple of the chip interval $T_c$ (denoted by $T_{chip}$ in the FIGS. 5-6).

As compared to the prior art summarized in the background section, embodiments of this invention are advantageous in that the TA can be carried out with arbitrary precision without increasing the up-sampling factor. In the prior art approaches surveyed above, the TA precision was limited by the up-sampling factor. A higher up-sampling factor in turn means higher sampling frequency, which increases the burden on the hardware blocks (e.g., higher speed requirements, higher power consumption) and their interconnections (e.g., higher interference sensitivity, higher losses). Embodiments of the approach detailed herein achieve increased TA precision without increasing the up-sampling factor, so the hardware can run with lower sampling frequency and the TA precision is not limited by hardware constraints as to a maximum up-sampling factor.

In the other prior art approach noted above where the TA is implemented using a poly-phase up-sampling FIR filter, the commutator switches that connect the filter coefficients and the multipliers need additional control to implement the TA functionality. For the case of time delay, the position of the commutators is frozen for a number of sampling periods; in the case of time advance, the commutators are moved ahead by skipping a number of positions. However, the approach detailed herein does not need such additional control inputs to the commutator switches, so the commutators can run freely in the up-sampling FIR. This results in reduced complexity of the TXDFE implementation as compared to the poly-phase FIR approach of the prior art.

Further, embodiments of this invention entail a simple and low-bandwidth baseband/radio frequency module interface. Specifically, if the TA adjustments detailed herein are implemented in baseband as in the detailed description above, the up-sampling is also carried out in baseband, and so the interface between baseband and RF needs to support high (up-sampled) data rates. If the TA adjustments detailed herein are implemented in the RF block, the interface between baseband and RF needs to carry the TA control information in addition to the transmitted signal samples. This is possible in embodiments of this invention, but the better approach is seen to be in baseband without the need for up-sampling, because this simplifies the baseband/RF interface considerably. Importantly, when this invention is implemented in baseband processing, the RF side of the interface need not know anything about the timing adjustment mechanism at all.

This increased and arbitrary precision comes at a cost of an additional number of complex multiplications that are carried out in the frequency domain. In the worst case (e.g., full-band sub-carrier allocation to one MS), this means $N_a$ complex multiplications per OFDMA block. However, these multiplications are in effect rotations and phase shifts, so they can be implemented efficiently in hardware via CORDIC rotations.

One implementation for which this invention is seen to be particularly advantageous is a fully standard compliant E-UTRAN modem (though the E-UTRAN standard may or may not specify to the detail described herein how the TA precision is achieved).

While described in the context of E-UTRAN and 3GPP, it is within the scope of the exemplary embodiments of this invention to use the above described synchronization maintenance procedures for other types of wireless communication systems, such as GSM, WiMAX, WCDMA, and other such systems that rely upon timing adjustment messages from base station to mobile station for adjusting timing of transmissions. For example, these teachings are readily adapted for operation in a WiMAX system since those transmitters and receivers typically generate modulated symbols in the frequency domain that are then converted to the time domain by an IDFT block 36. Some further adaptation might be necessary to adapt these teachings for conventional GSM and/or WCDMA hardware.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

I claim:

1. A method comprising:
an apparatus receiving a timing adjustment value;
the apparatus determining from the received timing adjustment value an integer portion and a fractional portion;
in the frequency domain, the apparatus applying the determined fractional portion by rotating a signal;
in the time domain, the apparatus applying the determined integer portion by one of inserting samples in the rotated signal or removing samples from the rotated signal in an amount corresponding to the determined integer portion; and
subsequently, the apparatus transmitting the signal,
wherein $-1 \leq \varepsilon < 1$ is the determined fractional portion, X[k] is the signal prior to rotation, $k=0,1,\ldots,N_a-1$, $N_a$ is a number of active sub-carriers, and N is a total number of sub-carriers; wherein rotating the signal comprises:

$$X_\varepsilon[k] = \begin{cases} X[k]\exp\left\{j\frac{2\pi}{N}\left(k - \frac{N_a}{2}\right)(1-\varepsilon)\right\}, & \varepsilon > 0 \\ X[k]\exp\left\{-j\frac{2\pi}{N}\left(k - \frac{N_a}{2}\right)\varepsilon\right\}, & \varepsilon \leq 0 \end{cases}.$$

2. A method comprising:
an apparatus receiving a timing adjustment value;
the apparatus determining from the received timing adjustment value an integer portion and a fractional portion;
in the frequency domain, the apparatus applying the determined fractional portion by rotating a signal;
in the time domain, the apparatus applying the determined integer portion by one of inserting samples in the rotated signal or removing samples from the rotated signal in an amount corresponding to the determined integer portion; and
subsequently, the apparatus transmitting the signal,
wherein $-1 \leq \varepsilon 1$ is the determined fractional portion, d is the determined integer portion, X[k] is the signal prior to rotation, $k=0,1,\ldots,N_a-1$, $N_a$ is a number of active sub-carriers, N is a total number of sub-carriers, and $T_c$ is a chip period; wherein rotating the signal further comprises the apparatus phase shifting the signal as:

$$X_\varepsilon[k] = \begin{cases} X[k]\exp\left\{j\frac{2\pi}{N}\left(k - \frac{N_a}{2}\right)(1-\varepsilon)\right\}\exp\left\{-j\frac{\pi}{N}(d+\varepsilon)\right\}, & \varepsilon > 0 \\ X[k]\exp\left\{-j\frac{2\pi}{N}\left(k - \frac{N_a}{2}\right)\varepsilon\right\}\exp\left\{-j\frac{\pi}{N}(d+\varepsilon)\right\}, & \varepsilon \leq 0 \end{cases}.$$

3. An apparatus comprising:
a processor and at least one memory storing a program of machine-readable instructions;
the processor configured with the at least one memory and the instructions to cause the apparatus at least to perform:
determining from a received timing adjustment value an integer portion and a fractional portion;
applying in the frequency domain the determined fractional portion by rotating an input signal; and
applying in the time domain the determined integer portion by one of inserting samples in the rotated signal or removing samples from the rotated signal in an amount corresponding to the determined integer portion, wherein $-1 \leq \epsilon < 1$ is the determined fractional portion, X[k] is the signal input for applying in the frequency domain the determined fractional portion, k=0,1, . . . , $N_a$-1, $N_a$ is a number of active sub-carriers, and N is a total number of sub-carriers; wherein the signal is rotated as:

$$X_\varepsilon[k] = \begin{cases} X[k]\exp\left\{j\frac{2\pi}{N}\left(k - \frac{N_a}{2}\right)(1-\varepsilon)\right\}, \varepsilon > 0 \\ X[k]\exp\left\{-j\frac{2\pi}{N}\left(k - \frac{N_a}{2}\right)\varepsilon\right\}, \varepsilon \leq 0 \end{cases}.$$

4. An apparatus comprising:
a processor and at least one memory storing a program of machine-readable instructions;
the processor configured with the at least one memory and the instructions to cause the apparatus at least to perform:
determining from a received timing adjustment value an integer portion and a fractional portion;
applying in the frequency domain the determined fractional portion by rotating an input signal; and
applying in the time domain the determined integer portion by one of inserting samples in the rotated signal or removing samples from the rotated signal in an amount corresponding to the determined integer portion,
wherein $-1 \leq \epsilon < 1$ is the determined fractional portion, d is the determined integer portion, X[k] is the signal input for applying in the frequency domain the determined fractional portion, k=0,1, . . . , $N_a$-1, $N_a$ is a number of active sub-carriers, N is a total number of sub-carriers, and $T_c$ is a chip period; wherein the signal rotated and phase shifted as:

$$X_\varepsilon[k] = \begin{cases} X[k]\exp\left\{j\frac{2\pi}{N}\left(k - \frac{N_a}{2}\right)(1-\varepsilon)\right\}\exp\left\{-j\frac{\pi}{N}(d+\varepsilon)\right\}, \varepsilon > 0 \\ X[k]\exp\left\{-j\frac{2\pi}{N}\left(k - \frac{N_a}{2}\right)\varepsilon\right\}\exp\left\{-j\frac{\pi}{N}(d+\varepsilon)\right\}, \varepsilon \leq 0 \end{cases}.$$

5. A computer readable memory embodying a program of machine-readable instructions executable by a digital data processor to perform actions directed toward applying a timing adjustment to a signal for transmission, the actions comprising:

determining from a wirelessly received timing adjustment value an integer portion and a fractional portion;
in the frequency domain, applying the determined fractional portion by rotating a signal; and
in the time domain, applying the determined integer portion by one of inserting samples in the rotated signal or removing samples from the rotated signal in an amount corresponding to the determined integer portion,
wherein $-1 \leq \epsilon < 1$ is the determined fractional portion, X[k] is the signal prior to rotation, k =0,1, . . . , $N_a$-1, $N_a$ is a number of active sub-carriers, and N is a total number of sub-carriers; wherein rotating the signal comprises:

$$X_\varepsilon[k] = \begin{cases} X[k]\exp\left\{j\frac{2\pi}{N}\left(k - \frac{N_a}{2}\right)(1-\varepsilon)\right\}, \varepsilon > 0 \\ X[k]\exp\left\{j\frac{2\pi}{N}\left(k - \frac{N_a}{2}\right)\varepsilon\right\}, \varepsilon \leq 0 \end{cases}.$$

6. A computer readable memory embodying a program of machine-readable instructions executable by a digital data processor to perform actions directed toward applying a timing adjustment to a signal for transmission, the actions comprising:
determining from a wirelessly received timing adjustment value an integer portion and a fractional portion;
in the frequency domain, applying the determined fractional portion by rotating a signal; and
in the time domain, applying the determined integer portion by one of inserting samples in the rotated signal or removing samples from the rotated signal in an amount corresponding to the determined integer portion,
wherein $-1 \leq \epsilon < 1$ is the determined fractional portion, d is the determined integer portion, X[k] is the signal prior to rotation, k =0,1, . . . , $N_a$-1, $N_a$ is a number of active sub-carriers, N is a total number of sub-carriers, and $T_c$ is a chip period; wherein rotating the signal further comprises phase shifting the signal as:

$$X_\varepsilon[k] = \begin{cases} X[k]\exp\left\{j\frac{2\pi}{N}\left(k - \frac{N_a}{2}\right)(1-\varepsilon)\right\}\exp\left\{-j\frac{2\pi}{N}(d+\varepsilon)\right\}, \varepsilon > 0 \\ X[k]\exp\left\{-j\frac{2\pi}{N}\left(k - \frac{N_a}{2}\right)\varepsilon\right\}\exp\left\{-j\frac{2\pi}{N}(d+\varepsilon)\right\}, \varepsilon \leq 0 \end{cases}.$$

\* \* \* \* \*

UNITED STATES PATENT AND TRADEMARK OFFICE
CERTIFICATE OF CORRECTION

PATENT NO. : 8,031,586 B2
APPLICATION NO. : 11/893249
DATED : October 4, 2011
INVENTOR(S) : Safar It is certified that error appears in the above-identified patent and that said Letters Patent is hereby corrected as shown below:

Claim 1, col. 12, line 17 delete "$-1 \leqq \varepsilon < 1$" and insert -- $-1 \leq \varepsilon < 1$ --.

Claim 2, col. 12, line 41 delete "$-1 \leqq \varepsilon < 1$" and insert -- $-1 \leq \varepsilon < 1$ --.

Claim 3, col. 13, line 1 delete "$-1 \leqq \varepsilon < 1$" and insert -- $-1 \leq \varepsilon < 1$ --.

Claim 4, col. 13, line 28 delete "$-1 \leqq \varepsilon < 1$" and insert -- $-1 \leq \varepsilon < 1$ --.

Claim 5, col. 14, line 9 delete "$-1 \leqq \varepsilon < 1$" and insert -- $-1 \leq \varepsilon < 1$ --.

Claim 5, col. 14, line 17 delete "
$$X_\varepsilon[k] = \begin{cases} X[k]\exp\left\{j\frac{2\pi}{N}\left(k - \frac{N_a}{2}\right)(1-\varepsilon)\right\}, & \varepsilon > 0 \\ X[k]\exp\left\{j\frac{2\pi}{N}\left(k - \frac{N_a}{2}\right)\varepsilon\right\}, & \varepsilon \leq 0 \end{cases}$$
"

and insert $$X_\varepsilon[k] = \begin{cases} X[k]\exp\left\{j\frac{2\pi}{N}\left(k - \frac{N_a}{2}\right)(1-\varepsilon)\right\}, & \varepsilon > 0 \\ X[k]\exp\left\{-j\frac{2\pi}{N}\left(k - \frac{N_a}{2}\right)\varepsilon\right\}, & \varepsilon \leq 0 \end{cases}$$

--.

Claim 6, col. 14, line 33 delete "$-1 \leqq \varepsilon < 1$" and insert -- $-1 \leq \varepsilon < 1$ --.

Signed and Sealed this
Sixth Day of March, 2012

David J. Kappos
*Director of the United States Patent and Trademark Office*

Claim 6, col. 14, line 41 delete

"$$X_\varepsilon[k] = \begin{cases} X[k]\exp\left\{j\dfrac{2\pi}{N}\left(k-\dfrac{N_a}{2}\right)(1-\varepsilon)\right\}\exp\left\{-j\dfrac{2\pi}{N}(d+\varepsilon)\right\}, & \varepsilon > 0 \\ X[k]\exp\left\{-j\dfrac{2\pi}{N}\left(k-\dfrac{N_a}{2}\right)\varepsilon\right\}\exp\left\{-j\dfrac{2\pi}{N}(d+\varepsilon)\right\}, & \varepsilon \leq 0 \end{cases}$$"

and insert $$X_\varepsilon[k] = \begin{cases} X[k]\exp\left\{j\dfrac{2\pi}{N}\left(k-\dfrac{N_a}{2}\right)(1-\varepsilon)\right\}\exp\left\{-j\dfrac{\pi}{N}(d+\varepsilon)\right\}, & \varepsilon > 0 \\ X[k]\exp\left\{-j\dfrac{2\pi}{N}\left(k-\dfrac{N_a}{2}\right)\varepsilon\right\}\exp\left\{-j\dfrac{\pi}{N}(d+\varepsilon)\right\}, & \varepsilon \leq 0 \end{cases}$$

--.